(12) United States Patent
Sakamoto et al.

(10) Patent No.: US 6,602,477 B2
(45) Date of Patent: *Aug. 5, 2003

(54) METAL HONEYCOMB STRUCTURE

(75) Inventors: Yasushi Sakamoto, Shizuoka (JP); Haruo Serizawa, Shizuoka (JP)

(73) Assignee: Usui Kokusai Sangyo Kaisha, Ltd., Shizuoka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/341,884

(22) PCT Filed: Oct. 20, 1997

(86) PCT No.: PCT/JP97/03773

§ 371 (c)(1), (2), (4) Date: Jul. 20, 1999

(87) PCT Pub. No.: WO99/20391

PCT Pub. Date: Apr. 29, 1999

(65) Prior Publication Data

US 2003/0012708 A1 Jan. 16, 2003

(51) Int. Cl.$^7$ .......................... B01D 53/86; F01N 3/28; B01J 35/04
(52) U.S. Cl. ...................... 422/180; 422/177; 428/593; 502/527.19
(58) Field of Search ................................ 422/177, 180, 422/171, 174; 502/439, 527.11, 527.18, 527.19, 527.21, 527.22, 527.24; 428/116, 593, 597

(56) References Cited

U.S. PATENT DOCUMENTS

| | | | | |
|---|---|---|---|---|
| 4,818,746 A | * | 4/1989 | Cyron | 502/439 |
| 4,832,998 A | * | 5/1989 | Cyron | 428/593 |
| 5,105,539 A | * | 4/1992 | Maus et al. | 29/890 |
| 5,173,471 A | * | 12/1992 | Usui et al. | 502/439 |
| 5,177,960 A | * | 1/1993 | Hitachi et al. | 422/180 |
| 5,342,588 A | * | 8/1994 | Humpolik | 422/180 |

FOREIGN PATENT DOCUMENTS

| | | |
|---|---|---|
| JP | 62-273050 | 11/1987 |
| JP | 62-273051 | 11/1987 |
| JP | 1-218637 | 8/1989 |
| JP | 2-160051 | 6/1990 |
| JP | 2-261518 | 10/1990 |
| JP | 3-502660 | 6/1991 |
| JP | 4-227855 | 8/1992 |

* cited by examiner

*Primary Examiner*—Hien Tran
(74) *Attorney, Agent, or Firm*—McDermott, Will & Emery

(57) ABSTRACT

The invention provides a metal honeycomb core body used as the principal structural element of an exhaust gas cleaning unit excellent in various performances and economy that is provided with a corrugated band member, that is a structural member of a metal honeycomb core body having a special waveform structure. The invention provides a metal honeycomb core body having honeycomb structure fabricated by bringing corrugated band members (1) and planar band members (2) made of thin-walled metal sheet alternately into contact. The corrugated band member (1) has a waveform structure obtained by using a waveform of an imaginary corrugated sheet (1') having crests and troughs which are in contact with a planar band member (2) and composed of a connected waveform having a desired waveheight (h) and one period length ($\lambda$'). A one period length ($\lambda$) of a new waveform is formed comprising the area (1a) where the waveform of the imaginary corrugated sheet (1') is in contact with the planar band member (2) on at least one pair of an adjacent crest and trough of a wave. The area (1b) which is not in contact with the planar band member (2) is connected adjacently to the area (1a) which is in contact with the planar band member (2). The area (1c) of at least one end of which is in contact with the planar band member (2) and is connected adjacently to the noncontact area (1b). An area (1b) which is not in contact with the planar band member (2) is formed so as to have a height of about one half (½·h) of the waveheight (h) of the imaginary corrugated sheet (1'). The new waveform is constituted by connecting the three areas (1a, 1b, and 1c) to form a waveform of one period length ($\lambda$) by use of the waveform of the imaginary corrugated sheet (1').

19 Claims, 10 Drawing Sheets

METAL HONEYCOMB STRUCTURE

BACKGROUND OF THE INVENTION

1. Field of the Invention

This invention relates to a metal honeycomb core body generally used in an exhaust gas cleaner of a motor vehicle for carrying exhaust gas cleaning catalyst (referred simply to as metal honeycomb core body hereinafter).

More particularly, this invention relates to a new structure of the above-mentioned metal honeycomb core body that is the principal structural element of an exhaust gas cleaner unit (metal carrier).

Further particularly, this invention relates to a new structure of the above-mentioned metal honeycomb core body that is the principal structural element of an exhaust gas cleaner (metal carrier) comprising a corrugated band member having special corrugated structure instead of the conventional metal honeycomb core body comprising a superposed planar band member (planar foil) and corrugated band member (corrugated foil).

2. Description of Related Art

As described herein above, the metal honeycomb core body that is the essential structural element of an exhaust gas cleaner unit (metal carrier) of the present invention is a metal honeycomb core body having a new special structure, which metal honeycomb core body is composed of a corrugated band member having a special structure instead of a conventional corrugated band member having simple corrugated structure.

Related art will be described hereinafter in relation to the new metal honeycomb core body having the special structure described herein above.

The first typical example of a metal honeycomb core body of this type which has been proposed heretofore is shown in FIG. 15 to FIG. 17 with inclusion of structural members.

As shown in the drawings, the metal honeycomb core body (H') of this type is a honeycomb core body (refer to FIG. 16 and FIG. 17) fabricated by superposing a corrugated band member (corrugated foil) (1') and a planar band member (planar foil) (2') comprising a heat-resistant, thin-walled metal sheet (refer to FIG. 15). The resultant superposed members are rolled together, and used as a mother body for carrying exhaust gas cleaning catalyst (for example, a catalyst system containing Pt, Rh, and Pd).

The above-mentioned metal honeycomb core body (H') is accommodated and fixed in the internal of a metal-made casing (C) to form a metal carrier (MS) as shown in FIG. 16 and FIG. 17.

The above-mentioned metal carrier is referred to as metal support or metal substrate in the industry, and generally denoted by the abbreviation MS. In this meaning, the above-mentioned abbreviation MS is used in FIG. 16 and FIG. 17.

The metal honeycomb core body is denoted by the abbreviation H in association with honeycomb structure. To distinguish between the present invention and the related art, honeycomb core body components used in the related art are denoted by abbreviation with a dash H'. The corrugated band member (corrugated foil) and planar band member (planar foil) that are components of the honeycomb core body used in the related art are also denoted by abbreviation with a dash 1' and 2' to distinguish between the present invention and the related art.

Further, the metal casing is denoted by the abbreviation C in association with casing.

As described hereinafter, various metal honeycomb core bodies have been proposed as the conventional metal honeycomb core body (H') described herein above for carrying exhaust gas cleaning catalyst.

The above-mentioned metal honeycomb core body (H') shown in FIG. 16 and FIG. 17 is generally referred to as rolling type in the industry in association with the superposed and rolled structure of a corrugated foil (1') and a planar foil (2').

FIG. 15 shows a perspective view of a pair of a corrugated foil (1') and a planar foil (2') which are components of the above-mentioned conventional rolling type metal honeycomb core body (H'). FIG. 16 shows a perspective view of a metal support (MS) fabricated by accommodating and fixing the above-mentioned conventional rolling type honeycomb core body (H') in a metal casing (C), and FIG. 17 shows a front view of the metal support (MS) shown in FIG. 16.

The above-mentioned conventional rolling type honeycomb core body (H') is a honeycomb core body having honeycomb structure comprising a number of network-patterned axial vent holes (cells) (3') formed by superposing a corrugated foil (1') and a planar foil (2') comprising a heat-resistant thin-walled steel sheet with a thickness of, for example, 100 $\mu$m or thinner (preferably 50 $\mu$m or thinner) and by rolling the resultant superposed band members together swirlingly. The shape and structure of the network-patterned axial vent holes (cells) in accordance with the present invention is different from those of the conventional art because of the difference in corrugated structure of a corrugated foil. To distinguish the present invention from the related art, the cell of the related art is denoted by an abbreviation with a 3'.

Other than the above-mentioned rolling type honeycomb core body, honeycomb core bodies having various structures which are different in fabrication method of honeycomb core body from a corrugated foil (1') and a planar foil (2') as described herein under have been proposed as the metal honeycomb core body (H') which has been proposed heretofore for carrying exhaust gas cleaning catalyst.

For example, a metal honeycomb core body of multi-layered type (refer to FIG. 18) which is fabricated by laying both bands (1' and 2') alternately to form a stack.

In addition, metal honeycomb core bodies (H') of radial type (refer to FIG. 19), S-shaped type (refer to FIG. 20), conjugated-comma type (refer to FIG. 21), and X-lap type (refer to FIG. 22) disclosed respectively in Japanese Published Unexamined Patent Application No. Sho 62-273050, Japanese Published Unexamined Patent Application No. Sho 62-273051, Japanese Published Unexamined Patent Application No. Hei 1-218637, Japanese Published Unexamined Patent Application No. Hei 3-502660, and Japanese Published Unexamined Patent Application No. Hei 4-227855 have been known.

The corrugated foil (1') that is a structural component of the above-mentioned various metal honeycomb core bodies of conventional multi-layered type, radial type, S-shaped type, conjugated-comma type, and X-lap type shown respectively in FIG. 18 to FIG. 22 including the above-mentioned metal honeycomb core body (H') of conventional rolling type shown in FIG. 16 and FIG. 17 can be replaced with the corrugated band member having special corrugated structure (1) of the present invention (described hereinafter) to form the metal honeycomb core body of the present invention.

In detail, the above-mentioned metal honeycomb core bodies (H') of various structures are in close relation to the present invention. Therefore, these honeycomb core bodies (H') of various structures are described further in detail hereinafter.

The metal honeycomb core body (H') of superposed type (multi-layered type) shown in FIG. 18 is fabricated by superposing (stacking) corrugated foils (1') and planar foils (2') comprising a heat-resistant, thin-walled metal sheet together one over the other in contiguous relationship each other.

The metal honeycomb core body (H') of radial type shown in FIG. 19 is fabricated by extending outward (radiating) a desired number of pairs of cleaning elements comprising corrugated foils (1') and planar foils (2') with fixing the one end of each cleaning element to the fixed shaft (center axis).

In FIG. 19, only the limited number of cleaning elements are shown for the purpose of clear illustration of a cleaner unit.

The metal honeycomb core bodies of S-shaped type and conjugated-comma type shown respectively in FIG. 20 and FIG. 21 are fabricated as described herein under.

To fabricate the above-mentioned honeycomb core bodies (H') of S-shaped and conjugated-comma type, corrugated foils (1') and planar foils (2') are superposed alternately up to a desired number to form a stack and the desired number of stacks are used for fabrication.

For example, the above-mentioned S-shaped metal honeycomb core body (H') (refer to FIG. 20) is fabricated by a process in which a pair of rod-like rolling tools are fixed vertically at the approximate center of the outermost surface of one stack and the rolling tools are rolled simultaneously in the same direction.

In the case of the metal honeycomb core bodies (H') of S-shaped type and conjugated-comma type, the structure wherein both ends of both foil members (1' and 2') which are components of the stack are in contact with the inside wall surface of an accommodating metal casing (C) is resulted in when the honeycomb core body (H') is inserted and fixed in the metal casing (C). The metal honeycomb core bodies (H') of S-shaped type and conjugated-comma type are excellent in durability because thermal stress (thermal deformation force) caused in the internal of the metal honeycomb core body (H') at the above-mentioned contact area is absorbed and relaxed effectively.

In the above-mentioned fabrication process, use of one stack gives a metal honeycomb core body (H') of S-shaped type having the structure that the component members are bent in S-shaped at the center as shown in FIG. 20. On the other hand, use of three stacks gives a metal honeycomb core body (H') of conjugated-comma type having the structure that the three stacks are bent in the conjugated-comma form at the center as shown in FIG. 21. In FIG. 20 and FIG. 21, only a limited number of corrugated foils (1') and planar foils (2') is shown for the purpose of clear illustration.

The metal honeycomb core body (H') of X-lap type shown in FIG. 22 is fabricated with four stacks (X1 to X4) which are formed by superposing corrugated foils (1') and planar foils (2') alternately up to the desired number. In detail, one end of each stack of four stacks (X1 to X4) is fixed in a contiguous relationship each other (refer to the center of MS in FIG. 22), and then each stack is rolled in the same direction round the contiguous center for fabrication.

In the case of the metal honeycomb core body (H') of X-lap type, the structure wherein one end of corrugated foils (1') and the planar foils (2') of each stack is in contact with the inside wall surface of an accommodating metal casing (C) is resulted in when the honeycomb core body (H') is inserted and fixed in the metal casing (C).

It is obvious from the fabrication process described herein above and FIG. 22 that the respective stacks are combined in the X-shaped form at the center of the metal honeycomb core body (H'), and the metal honeycomb core body (H') of this type is referred generally to as X-lap type in association with the combination in the X-shaped form. In FIG. 22, only the limited number of corrugated foils (1') and planar foils (2') is shown for the purpose of clear illustration.

The above-mentioned metal honeycomb core bodies (H') having various structures proposed heretofore are accommodated and fixed in a metal casing (C) to form a metal support (MS).

A metal-made cylinder for accommodating and fixing the metal honeycomb core body (H') in the internal thereof is used as a metal casing (C) which is a structural element of the above-mentioned metal support (MS).

The front (cross section) shape of the metal casing (C) is not limited to a circle shown in FIG. 16 to FIG. 22, for example, an ellipse, elongated-circular, race track-shaped, polygonal, and special shaped metal casing (C) may be used as long as the shape is suitable as the front (cross section) shape of the metal honeycomb core body (H').

The metal support (MS) having the above-mentioned conventional metal honeycomb core body (H') of various structures as the principal structural element is used in a severe thermal environmental condition, namely in an exhaust gas system. The most important point from the viewpoint of durability of a metal support (MS) is a firm joint at the contact between both foil members (corrugated foil and planar foil) (1' and 2') which are structural members of the metal honeycomb core body (H').

The metal honeycomb core body (H') is subjected to a high temperature condition due to the high temperature of exhaust gas itself and the exothermic reaction between the exhaust gas and carried exhaust gas cleaning catalyst. Because the high temperature causes significant thermal stress in the high temperature atmosphere, the contact is firmly jointed by means of welding or brazing so as to be durable to the thermal stress.

For example, to absorb and relax significant stress effectively which is caused in the internal of the metal honeycomb core body (H'), contacts between a corrugated foil (1') and a planar foil (2') on specified portions in the honeycomb core body (H') are jointed together by means of a jointing means, such as welding and brazing. The above-mentioned method in which only specified portions out of contacts between a corrugated foil (1') and planar foil (2') are jointed together by means of a jointing means, such as brazing, allows the thermal stress to be absorbed and relaxed at noncontact area more easily in comparison with the method in which all the contacts are jointed.

From the viewpoint of ensuring the durability of the metal support (MS), the second important point is a firm joint between the metal honeycomb core body (H') and the metal casing (C) at the contact area so as not to be separated due to the above-mentioned thermal stress and vibration of both structural members.

The significant thermal stress which is caused in the internal of the metal honeycomb core body (H') as described herein above is concentrated and accumulated on the contact area between both structural members to cause separation of both structural members. To avoid such separation by absorption and relaxation of the above-mentioned thermal stress, a method that both structural components are jointed together at only specified portions by means of a jointing means, such as brazing, has been proposed.

As described hereinbefore, in the conventional metal support (MS) particularly in the conventional metal honeycomb core body (H') that is the principal structural member of the metal support (MS), from the view point of ensuring the durability, the corrugated foil (1') and the planar foil (2'), which are structural members of the metal honeycomb core body (H'), are brought into contact each other at crests and troughs of the corrugated foil (1'), and jointed firmly at the contact area.

As the result, the above-mentioned contact area of both foils (1' and 2') can not carry exhaust gas cleaning catalyst material, and the effective area served for carrying catalyst to the total surface area of both foils (1' and 2') is reduced.

The above mentioned disadvantage that is the low effective area of both foils (1' and 2') is described in detail herein under.

The weight-base price of heat-resistant steel foil consisting of heat-resistant Fe—Cr 20%-Al 5% steel having a thickness of 50 μm or thinner, which is usually used as the corrugated foil (1') and the planar foil (2') of this type is around five times that of SUS304 foil having a thickness of around 1.5 mm and extremely expensive, accordingly the reduction in effective area ratio for carrying catalyst on the contact area of the above-mentioned both foil members (1' and 2') is economically disadvantageous.

In this connection, the percentage of material cost due to the above-mentioned heat-resistant steel foil (1' and 2') to the total cost of a metal support (MS) is as high as 50%, the increment in the effective area ratio for carrying exhaust gas cleaning catalyst of the heat-resistant steel foil (1' and 2') or improvement in exhaust gas cleaning performance at a certain effective area ratio to reduce the required quantity of the heat-resistant steel foil (1' and 2') is essentially necessary from the economical viewpoint.

Further, the important point to be addressed in the conventional metal support (MS) is the jointing means applied in the fabrication of metal supports (MS). As described hereinbefore, in the fabrication of metal supports (MS), the contact between both foils (corrugated foil and planar foil) (1' and 2') which are structural members of the metal honeycomb core body (H') and the contact area between the metal honeycomb core body (H') and the metal casing (C) are jointed by means of jointing means such as brazing and welding to ensure the durability.

Generally, the brazing joint is employed as the jointing means from the viewpoint of productivity and uniform joint strength. However, expensive high-temperature brazing material such as material consisting of Ni-based material and Ni-Cr based material has been used in the above-mentioned brazing jointing because of the severe service condition of a metal support (MS) in a high temperature atmosphere. Therefore, the reduction of the required quantity of the material is essentially necessary from the economical viewpoint.

The large contact area between both foil members (corrugated foil and planar foil) (1' and 2') as described herein above leads to the increased consumption quantity of brazing material, and the increased quantity of brazing material used for jointing causes problems such as decreased heat resistance of both foil members (1' and 2') due to an alloying reaction and a diffusion reaction between the brazing material and the metal composition of both foil members (1' and 2'). The reduction of consumption quantity of brazing material used for jointing is essentially necessary also from this view point.

SUMMARY OF THE INVENTION

The present invention was invented in view of the limit of the above-mentioned conventional metal honeycomb core body (H') used for carrying exhaust gas cleaning catalyst.

The inventors of the present invention have conducted various investigations to develop a metal honeycomb core body having a new structure.

As the result, the inventors of the present invention attained to the finding that the change of the corrugated structure of a corrugated foil (1') that was the structural member of the conventional metal honeycomb core body (H') to a special structure brought about the excellent effect such as the substantial reduction of contact loss due to the contact between both foil members (1' and 2') (in other words, improvement of effective use of both foil members, further in other words, saving of expensive foil material based on the significant reduction of contact loss), significant reduction of exhaust back pressure resistance (draft resistance of exhaust gas), which significantly influences the efficiency of an internal combustion engine, and improvement of absorption and relaxation capability.

In detail, the inventors of the present invention attained to the finding that the above-mentioned excellent performances were exhibited when the special waveform structure was employed as the waveform of the corrugated foil (1') which was in contact with the planar foil (2'), that was a structural member of the conventional metal honeycomb core body (H').

The special waveform
(1) has an area (a) which is in contact with the planar foil (2'), and
(2) has a noncontact area (b) which is not in contact with the planar foil (2') connected adjacently to the area (a) which is in contact with the planar foil (2'),
wherein
(3) the waveform of the noncontact area (b) has a waveheight of about one half of the waveheight of the conventional corrugated sheet (1') and has a wave plane approximately parallel to the planar foil (2'), and
(4) the special waveform structure has a new one period length repeating unit including the area (a) which is in contact with the planar foil (2') and the noncontact area (b) which is not in contact with the planar foil (2').

Further (described hereinafter), the area other than the areas (a and b) is recognized as the area (c) in the above-mentioned new one period length repeating unit.

The present invention has been accomplished based on the above-mentioned findings.

The present invention provides a metal honeycomb core body (H) having a new structure that is the principal structural element of an exhaust gas cleaning metal support (MS) that is excellent in economy and various performances.

According to the outline of the present invention, the present invention relates to a metal honeycomb core body having honeycomb structure fabricated by bringing corrugated band members (1) and planar band members (2) made of thin-walled metal sheet alternately into contact, which is used for carrying exhaust gas cleaning catalyst, wherein the corrugated band member (1) has the waveform structure obtained by;
(1). with use of the waveform of an imaginery corrugated sheet (1') having crests and troughs which are in contact with a planar band member (2), and composed of a connected waveform having a desired waveheight of (h) and wavelength (one period length) of (λ'), (2)-1. forming one period length (λ) of a new waveform comprising the area (1a) where the waveform of the imaginary corrugated sheet (1') is in contact with the planar band member (2) on at least one pair of an adjacent crest and trough of a wave, the area (1b) which is not in contact with the planar band member (2) connected adjacently to the area (1a) which is in contact with the planar band member (2), and the area (1c) at least one end of which is in contact with the planar band member (2) and which is connected adjacently to the noncontact area (1b), (2)-2. forming the area (1b) which is not in contact with the planar band member (2) so as to have a height of about one half (½·h) of the waveheight (h) of the imaginary corrugated sheet (1'), and (3). constituting the new waveform by connecting the three areas (1a, 1b, and 1c) to form a waveform of one period length (λ) by use of the waveform of the imaginary corrugated sheet (1').

ADVANTAGES OF THE INVENTION

A metal honeycomb core body (II) that is the principal structural element of an exhaust gas cleaning metal support (MS) of the present invention is a quite new metal honeycomb core body (H) which is quite different from a metal honeycomb core body (H') fabricated by use of a corrugated band member (1') having the conventional simple waveform structure and a planar band member (2').

Particularly, the metal honeycomb core body (H) of the present invention comprises a corrugated band member (1) having the special waveform structure instead of the conventional simple waveform structure and a planar band member (2) as the structural member. Particularly, the waveform structure of the corrugated band member (1) is obtained by;

(1). with use of the waveform of the imaginary corrugated sheet (1'), having crests and troughs which are in contact with a planar band member (2), and composed of a connected waveform having a desired waveheight of (h) and wavelength (one period length ) of (λ), (2)-1. forming one period length (λ) of a new waveform comprising the area (1a) where the waveform of the imaginary corrugated sheet (1') is in contact with the planar band member (2) on at least one pair of adjacent crest and trough of a wave, the area (1b) which is not in contact with the planar band member (2) connected adjacently to the area (1a) which is in contact with the planar band member (2), and the area (1c) at least one end of which is in contact with the planar band member (2) and which is connected adjacently to the noncontact area (1b), (2)-2. forming the area (1b) which is not in contact with the planar band member (2) so as to have a height of about one half (½·h) of the waveheight (h) of the imaginary corrugated sheet (1'), and (3). constituting the new waveform by connecting the three areas (1a, 1b, and 1c) to form a waveform of one period length (λ) by use of the waveform of the imaginary corrugated sheet (1').

The metal honeycomb core body (H) of the present invention functions to exhibit excellent effect, which has not been realized before, because of the special waveform structure of the corrugated band member (1) that is a structural member of the metal honeycomb core body (H).

The corrugated band member (1) and the planar band member (2) that are structural members of the metal honeycomb core body (H) of the present invention functions to reduce the loss due to contact between both band members (1 and 2) (contact loss) greatly in comparison with the conventional structure because of the waveform structure of the corrugated band member (1). The reason is that the corrugated band member (1) having the special waveform structure of the present invention is structured so as to have less contact area with the planar band member in comparison with the conventional corrugated band member (1').

The great reduction of the contact loss brings about increased effective surface area percentage of the expensive band materials (1 and 2) for carrying exhaust gas cleaning catalyst.

Accordingly, the great reduction of the contact loss of both band materials (1 and 2) leads to reduced consumption of expensive band materials (1 and 2) and compact and smallsized metal honeycomb core body (H). The substantial saving of the expensive band members (1 and 2) contributes to the improvement of starting performance of the metal honeycomb core body (H). The reason is that the heat capacity of the metal honeycomb core body (H) is reduced because of the substantial saving of the band materials (1 and 2) to result in improved warming up performance, and thus the metal honeycomb core body (H) is heated rapidly to the optimal catalytic reaction temperature within a short time.

Further, as the associated effect of the reduction of the contact loss of both band materials (1 and 2), the consumption of high temperature brazing material used to fix the contact between both band members (1 and 2) is saved.

The exhaust gas vent hole passage (cell) of the metal honeycomb core body (H) can be prescribed to be larger than that of conventional metal honeycomb core body (H') because of the special waveform structure of the corrugated band member (1) of the present invention.

Accordingly, the metal honeycomb core body (H) of the present invention allows the back pressure resistance (draft resistance) to be prescribed to be small without a reduction of exhaust gas cleaning performance in comparison with a conventional metal honeycomb core body (H').

Thus, the metal honeycomb core body (H) of the present invention can achieve high exhaust gas cleaning performance without a reduction of the efficiency of an internal combustion engine.

In the present invention, the thermal stress and thermal deforming force is effectively absorbed and relaxed by the area where the corrugated band member (1) is not in contact with the planar band member (2). Accordingly, the metal honeycomb core body (H) of the present invention is excellent in durability.

In the figures described herein above, characters in the figures represent the meaning as described herein under.

MS . . . metal support
H . . . metal honeycomb core body of this invention
C . . . metal casing 1 . . . corrugated band member
1$a$ . . . contact area with a planar band member (2)
1$b$ . . . noncontact area with a planar band member (2)
h . . . wave height
λ . . . one wavelength (one period length)
A . . . area of triangle waveform formed on a corrugated band member (1)
2 . . . a planar band member used for a metal honeycomb core body (H) of the present invention
3 . . . exhaust gas vent passage (cell) of a metal honeycomb core body of the present invention.
1'. . . imaginary corrugated sheet (conventional corrugated band member)
2'. . . planar band member of a conventional metal honeycomb core body (H').
3'. . . exhaust gas vent passage (cell) of a conventional metal honeycomb core body (H').

DETAILED DESCRIPTION OF THE PREFERRED EMBODIMENTS

The technical structure and embodiments of the present invention will be described in detail hereinafter with reference to the drawings.

The present invention is by no means limited to the exemplified embodiments.

Figure 1:
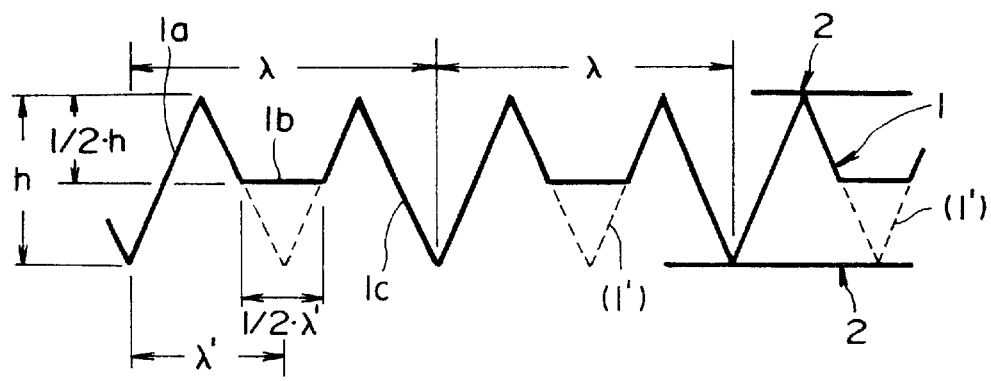
FIG. 1 is a partially enlarged front view of a corrugated band member (1) of the first embodiment which will be applied to a metal honeycomb core body (H') of the present invention.
Figure 2:
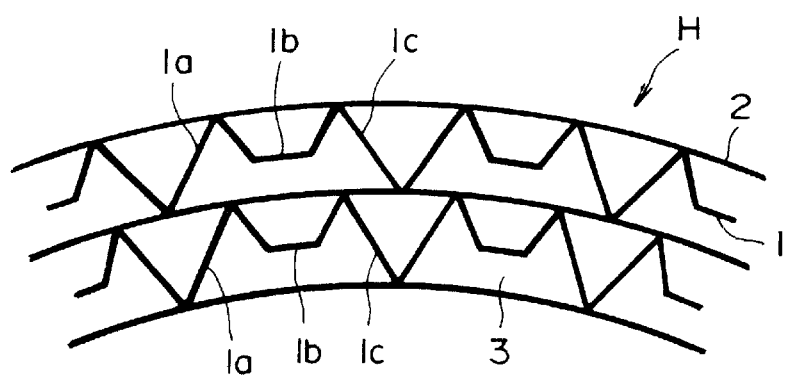
FIG. 2 is a partially enlarged front view of a metal honeycomb core body (H) of the present invention comprising the above-mentioned corrugated band member shown in FIG. 1 and a planar band member (2).

FIG. 1 and FIG. 2 are drawings for illustrating the structure of a metal honeycomb core body (H) of the present invention.

FIG. 1 is a drawing for illustrating a corrugated band member of the first embodiment having a special waveform structure that is the structural member of a metal honeycomb core body (H) of the present invention. FIG. 1 is an enlarged front view of the corrugated band member (1).

Figure 17:
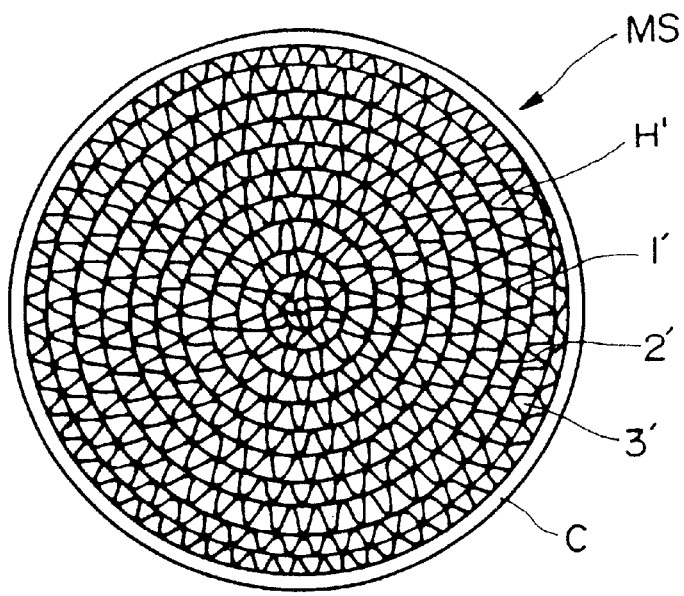
FIG. 17 is a front view of the conventional metal support (MS) shown in FIG. 16.
Figure 18:
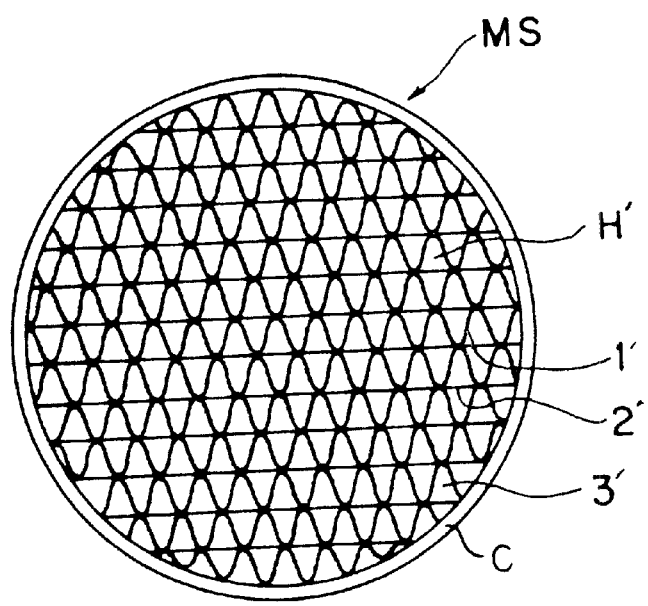
FIG. 18 is a front view of a conventional multi-layered type metal honeycomb core body (H').
Figure 19:
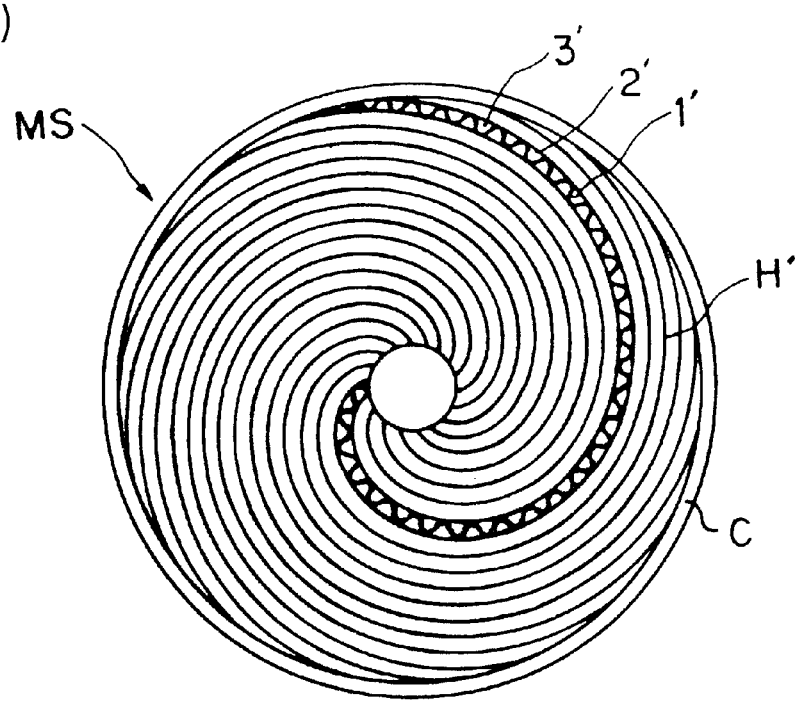
FIG. 19 is a partially omitted front view of a conventional radial type metal honeycomb core body (H').

FIG. 2 is a partially enlarged front view of a metal honeycomb core body (H) of the present invention fabricated with the corrugated band member (1) of the first embodiment shown in FIG. 1 and a planar band member (2) that is the other structural member of a metal honeycomb core body (H). FIG. 2 corresponds to a drawing which is derived by partial enlargement of the front view of a conventional rolling type metal honeycomb core body (H') shown in FIG. 17.

As shown in FIG. 1 and FIG. 2, the metal honeycomb core body (H) of the present invention is featured in the waveform structure of the corrugated band member (1).

The waveform structure of the corrugated band member (1) of the first embodiment of the present invention comprises the structure described herein under as shown particularly in FIG. 1.

Figure 15:
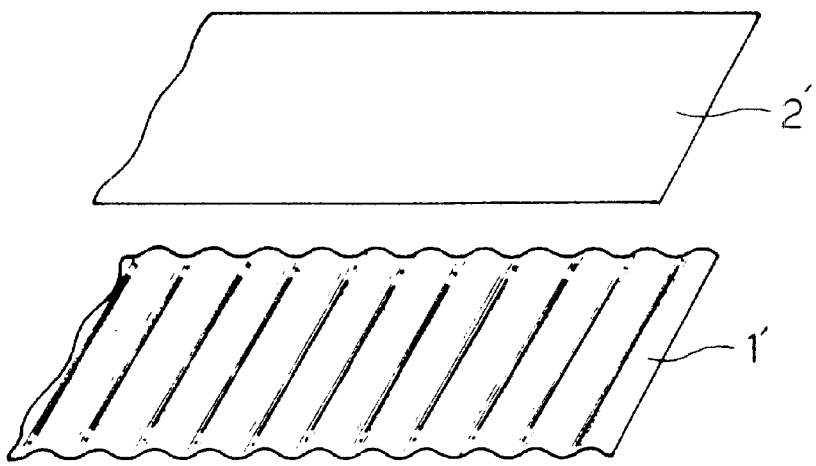
FIG. 15 is a perspective view of a corrugated band member (1') and planar band member (2') used for fabrication of a conventional rolling type metal honeycomb core body (H').

The feature of the waveform structure of the corrugated band member (1) of the first embodiment of the present invention can be understood easily in the comparison with the corresponding conventional corrugated band member (1') (shown in FIG. 15).

In FIG. 1, a corrugated band member (1') used as a structural member of a conventional metal honeycomb core body (H') is shown with a dotted line as an imaginary (virtual) corrugated band member (1') to emphasize the feature of the waveform structure of the corrugated band member (1) of the present invention.

In the present invention, the imaginary corrugated sheet (1') is the same as a corrugated band member (1') having, for example, a conventional simple triangular waveform or sine waveform as described herein above (refer to FIG. 15).

In FIG. 1, the corrugated band member (1) of the present invention is shown with a solid line, on the other hand, the corrugated band member (1') having the conventional triangular waveform, namely the imaginary corrugated sheet (1') having the triangular waveform, is a corrugated band member having the triangular waveform which is formed by replacing the flat noncontact area (1b) (flat area shown in FIG. 1) of the corrugated band member (1) of the present invention with the triangular waveform shown with a dotted line.

As shown in FIG. 1, in the waveform structure of the imaginary corrugated sheet (1'), all the crests and troughs of all the waves are in contact with the planar band member (2) similarly to the conventional corrugated band member (1'), and the waveform comprises successive triangular waveforms having a waveheight of (h) and wavelength (one period length) of (λ').

In the present invention, the waveform structure of the imaginary corrugated sheet (1') is by no means limited to the above-mentioned triangular waveform, the waveform structure may be any desired waveform structure of the conventional corrugated band member (1') such as sine waveform, omega (Ω) waveform, rectangular waveform, and trapezoidal waveform.

Accordingly, the waveform structure of an area (1a) of a corrugated band member of the present invention which is to be in contact with a planar band member (2) is by no means limited to the triangular waveform as it is obviously understood from the structure that the waveform is formed by cutting the waveform of the imaginary corrugated sheet (1') in the context of the definition.

As shown in FIG. 1, the corrugated band member (1) of the first embodiment of the present invention is formed as described herein under.

In detail, the waveform structure of the corrugated band member (1) having a special waveform structure of the present invention is formed as described herein under as shown in FIG. 1.

(1) With use of the waveform of the imaginary corrugated sheet (1') formed by successively connected triangular waveforms having a desired waveheight (h) and one period length (λ') having crests and troughs of waves which are in contact with a planar band member (2), in other words, a conventional simply structured-corrugated band member (1') used in the prior art (refer to FIG. 15), (2)-1 forming a new waveform of one period length (λ) comprising an area (1a) having a pair of adjacent crest and trough of the waveform of the imaginary corrugated sheet (1') which are contact with the planar band member (2), and noncontact area (1b) which is not in contact with the planar band member (2) located in continuation to the contact area (1a), and an area (1c) which is continuous to the noncontact area (1b) and in contact with the planar band member (2) at both ends, (2)-2 forming the waveform of the noncontact area (1b) which is not in contact with the planar band member (2) having a wave plane approximately parallel to the planar band member (2) of a height approximately ½ of the waveheight (h) of the imaginary corrugated sheet (1'), and (3) continuously connecting to form the waveform of one period length (λ) formed on the imaginary corrugated sheet (1') as described herein above.

As show in FIG. 1, in the areas (1a, 1b, and 1c), the area (1c) should be understood as a complementary area for completing the waveform of one period length (one unit length).

As shown in FIG. 1 or as shown in FIG. 3 and FIG. 5 to FIG. 7, which will be described hereinafter, the complementary area (1c) is structured so as to continue to (1) a noncontact area (1b) and, (2) a contact area which is in contact with the planar band member (2) at the next one period length (one unit length) of the waveform, with addressing on the one period length (one unit length) (λ).

Figure 7:
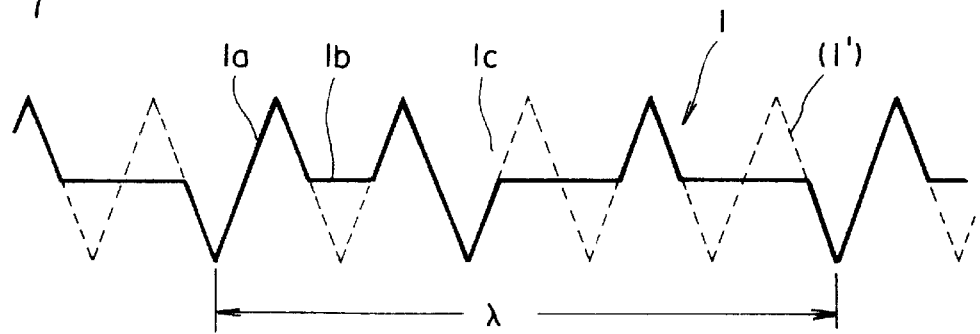
FIG. 7 is a partially enlarged front view of a corrugated band member (1) of the fifth embodiment which will be applied to a metal honeycomb core body (H) of the present invention.

In the present invention, the complementary area (1c) may have a desired number of contact areas which are in contact with the planar band member (2) and noncontact areas (1b) different from the areas (1a and 1b) as shown in FIG. 7, which will be described hereinafter. In such case, of course, the areas (1a and 1b) and area (1c) forms cooperatively one period length (λ).

From the above-mentioned description, the complementary area (1c) in the present invention is defined as the area that the area is connected to the noncontact area (1b) and at least one end of the area is in contact with a planar band member (2).

Further in the present invention, the contact of the adjacent crest and trough of the triangular waveform in the contact area (1a) is by no means limited to the contact of a pair of crest and trough with the planar band member (2) shown in FIG. 1, for example, the contact of two pairs, or the contact of desired number of pairs such as three pairs may be used.

Further, the approximately parallel relationship between the noncontact area (1b) of the wave plane and the planar band member (2) should be understood widely. For example, nonparallel relationship due to deformation in the manufacturing process of corrugated band members (1) or deformation which occurs during fabrication of the metal honeycomb core bodies (H) of rolling type and S-shaped type from corrugated band members (1) and planar band members (2) should be allowed to be included in the approximately parallel relationship.

The corrugated band member (1) of the first embodiment of the present invention formed with reference to the above-mentioned imaginary corrugated sheet (1') has a desired height (h) and one period length (λ).

Figure 8:
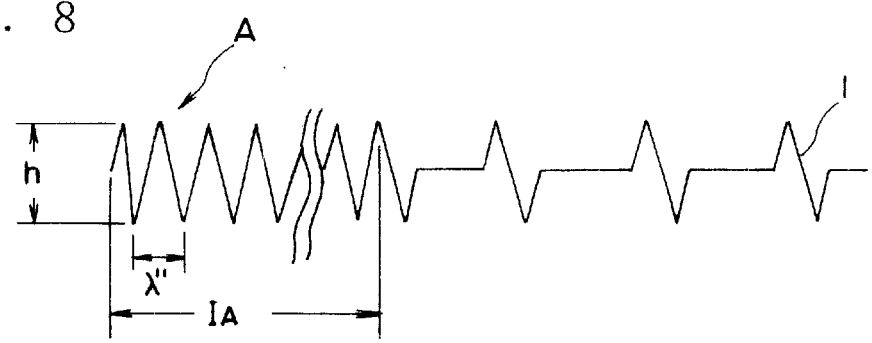
FIG. 8 is a partially enlarged front view of a corrugated band member (1) of the sixth embodiment which will be applied to a metal honeycomb core body (H) of the present invention.

In the present invention, in general, if a corrugated band member (1) having a large noncontact area (1b) is used, the contact area can not withstand the processing stress exerted when the corrugated band member (1) and a planar band member (2) are rolled together, and the waveform shape of the corrugated band member is apt to be deformed. To improve the above-mentioned disadvantage, the waveform structure of a corrugated band member (1) of the present invention is preferably defined, using the waveform of the imaginary corrugated sheet (1') having a pitch (p) and waveheight (h) in the relationship of, for example, p: h=1:1 to 0.8. As described hereinafter in detail, a corrugated band member (1) of the present invention may be constituted of the structure having both above-mentioned waveform structure and additional other waveform structures as shown in FIG. 8.

In a corrugated band member (1) of the present invention, the above-mentioned waveheight (h) and one period length (λ) may be prescribed desirably.

Figure 16:
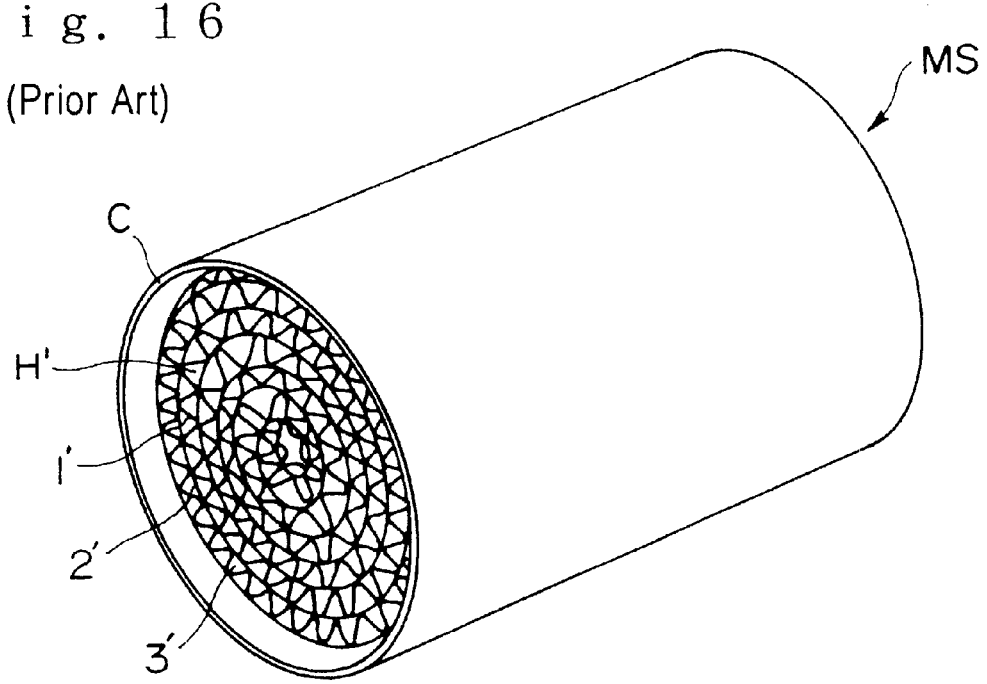
FIG. 16 is a perspective view of a metal support (MS) comprising a conventional rolling type metal honeycomb core body (H') and a metal casing (C).

For example, the wavelength may be prescribed to be 1.0 mm to 2.5 mm, and one period length (wave pitch) may be prescribed to be 2 mm to 10 mm. For example, a conventional rolling type metal honeycomb core body (H') (refer to FIG. 16 and FIG. 17) having a diameter of 90 mm, a waveheight (h) of 1.4 mm, and a pitch of 3.2 mm (number of cells is 300 cpsi) has been known.

In the metal honeycomb core body (H) of the present invention, because the above-mentioned corrugated band member (1) of the present invention that is a structural member has the above-mentioned special waveform structure, the contact loss due to contact between both band members (1 and 2) as shown in FIG. 2 is reduced significantly in comparison with the conventional waveform structure. The reduced contact loss brings about an improvement of the effective surface area percentage for carrying exhaust gas cleaning catalyst and a saving of the consumption of expensive band member materials (1 and 2). For example, approximately 20% or more material consumption is saved in comparison with the conventional waveform structure.

As an associated effect, because the contact between both band members (1 and 2) is reduced, the consumption of expensive high temperature brazing material used for brazing the contact between both band members (1 and 2) is also saved.

As shown in FIG. 2, in a metal honeycomb core body (H) of the present invention, the open area percentage of each cell served as the exhaust gas vent passage (cell) (3) can be prescribed to be large in comparison with the conventional cell (3') (refer to FIG. 17) due to the waveform structure of the above-mentioned corrugated band member (1) of the present invention.

As the result, the metal honeycomb core body (H) of the present invention functions to reduce the back pressure resistance (draft resistance), which influences significantly the efficiency of an internal combustion engine, without reduction of exhaust gas cleaning capability more significantly than the conventional metal honeycomb core body (H'). For example, the back pressure resistance (draft resistance) is reduced by approximately 15% or more.

Further, the metal honeycomb core body (H) of the present invention functions to effectively absorb and relax the severe thermal stress caused in the internal of the metal honeycomb core body (H) at the noncontact area (1b) of the corrugated band member (2) which is not in contact with a planar band member (2). Therefore, the metal honeycomb core body (H) of the present invention is excellent in durability.

In the metal honeycomb core body (H) of the present invention, a corrugated band member (1) of the first embodiment having the above-mentioned special waveform structure may comprise the same thin-walled metal sheet made of heat resistant steel as used for conventional corrugated band members (1') and planar band members (2') applied to fabricate metal honeycomb core bodies of this type.

The above-mentioned corrugated band member (1) of the present invention may be manufactured by corrugating a planar band member (2). As the planar band member of this type, a band member which is used for fabricating the usual metal monolith type metal honeycomb core bodies, for example, heat resistant stainless steel such as chrome steel (13% to 25% chromium) or Fe—Cr 20% -Al 5%, or heat resistant stainless steel added with rare earth metal (REM such as Ce or Y) to improve the resistance to high temperature oxidation, having a thickness of 20 $\mu$m to 100 $\mu$m is used.

In particular as the above-mentioned planar band member (2), the band material which contains Al or the band material manufactured by a method in which a material having an Al layer on the surface thereof is heat-treated to deposit whisker or mushroom-shaped alumina (Al2O3) is used preferably. The above-mentioned whisker-shaped alumina layer or the like is used preferably because a washcoat layer for carrying exhaust gas cleaning catalyst such as Pt, Pd, and Rh is held firmly.

In the metal honeycomb core body (H) of the present invention, the corrugated band member (1) that is the essential structural member is by no means limited to the above-mentioned band materials, various modifications may be possible.

Other embodiments of the corrugated band member (1) having a special waveform structure applied to the metal honeycomb core body (H) of the present invention and methods for manufacturing these corrugated band members (1) are described hereinafter.

Figure 3:
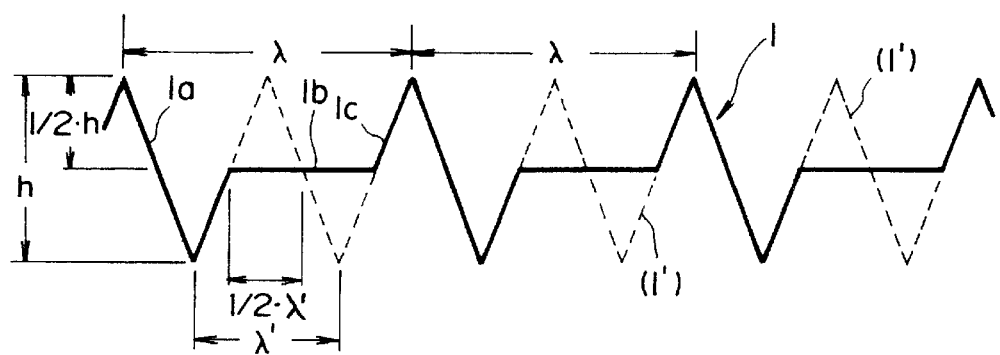
FIG. 3 is a partially enlarged front view of a corrugated band member (1) of the second embodiment which will be applied to a metal honeycomb core body (H) of the present invention.
Figure 4:
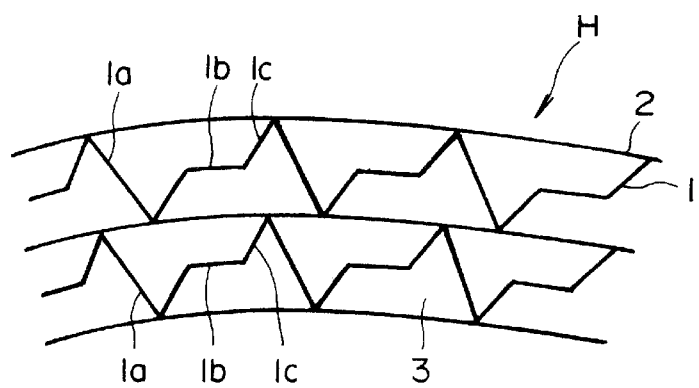
FIG. 4 is a partially enlarged front view of a metal honeycomb core body (H) of the present invention comprising the above-mentioned corrugated band member shown in FIG. 3 and a planar band member (2).

FIG. 3 and FIG. 4 are drawings for illustrating a corrugated band member (1) of the second embodiment applied to the metal honeycomb core body (H) of the present invention.

Herein, FIG. 3 and FIG. 4 correspond to FIG. 1 and FIG. 2 which were described in relation to the corrugated band member (1) of the first embodiment applied to the metal honeycomb core body (H) of the present invention.

In the above-mentioned corrugated band member (1) of the second embodiment shown in FIG. 3 and FIG. 4, the height formed on a noncontact area (1b) is prescribed to be ½(h) and the length of a flat wave plane (the width in the moving direction of the waveform) is prescribed to be the length of one wavelength ($\lambda$') of the imaginary corrugated sheet (1'). On the other hand, in the above-mentioned corrugated band member (1) of the first embodiment shown in FIG. 1 and FIG. 2, the length of a flat wave plane is prescribed to be the length of one half wavelength (½·$\lambda$).

In the corrugated band member (1) of the second embodiment shown in FIG. 3 and FIG. 4, the shape of an area (1c), namely the shape of a complementary area for completing a waveform of one period length (one unit length) ($\lambda$), is different from the complementary area (1c) (refer to FIG. 1) of the above-mentioned first embodiment based on the structure of the above-mentioned noncontact area (1b).

A metal honeycomb core body (H) of the present invention fabricated by the use of the corrugated band member (1) of the second embodiment shown in FIG. 3 and FIG. 4 is excellent in performance as described herein under in comparison with the conventional metal honeycomb core body (H').

Herein, the structure of the metal honeycomb core body (H) of the present invention and the conventional metal honeycomb core body (H') is described herein under.

(1) The metal honeycomb core body (H) of the present invention:
  Thickness of a corrugated band member (1) and planar band member (2): 5 $\mu$m
  Waveheight: 1.8 mm
  One period length ($\lambda$): 4.0 mm
  Number of cells: 180 (cell/in$^2$)
  Surface area after loading catalyst: 2.7 (m$^2$/liter)
(2) The conventional metal honeycomb core body (H')
  Thickness of a corrugated band member (1') and planar band member (2'): 50 $\mu$m
  Waveheight: 1.2 mm
  One period length ($\lambda$'): 2.5 mm
  Number of cells: 400 (cell/in$^2$)
  Surface area after loading catalyst: 2.7 (m$^2$/liter)

The metal honeycomb core body (H) of the present invention is advantageous over the conventional metal honeycomb core body (H') as described herein under.

(a) Consumption of band material (1 and 2) saved is 25%.
(b) Draft resistance is reduced 15 to 20%.
(c) Bulk density is reduced from conventional 770 (g/liter) to 570 (g/liter).

Figure 5:
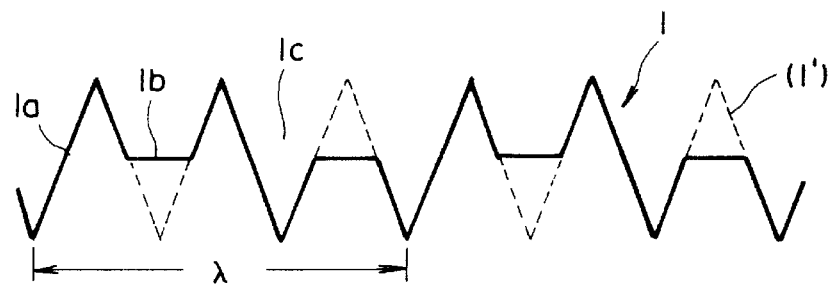
FIG. 5 is a partially enlarged front view of a corrugated band member (1) of the third embodiment which will be applied to a metal honeycomb core body (H) of the present invention.

FIG. 5 illustrates a corrugated band member (1) of the third embodiment applied to a metal honeycomb core body (H) of the present invention, and corresponds to FIG. 1.

In the corrugated band member (1) of the third embodiment shown in FIG. 5, the shape of a complementary area for completing the waveform of one period length (one unit length) (λ) is significantly different from those of the above-mentioned first embodiment and second embodiment (refer to FIG. 1 and FIG. 3). In detail, the shape of a complementary area (1c) of the corrugated band member (1) of the third embodiment is a shape having a noncontact area (1b) cooperatively in its area (1c).

Figure 6:
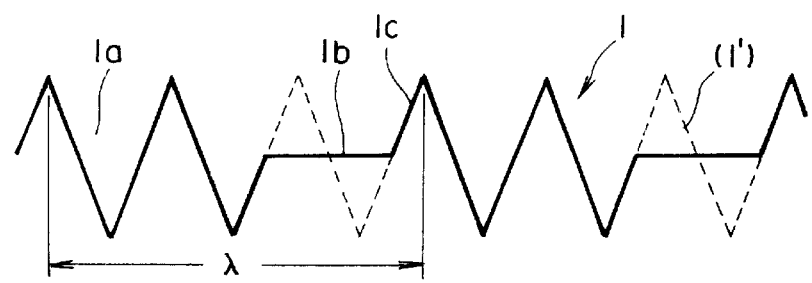
FIG. 6 is a partially enlarged front view of a corrugated band member (1) of the fourth embodiment which will be applied to a metal honeycomb core body (H) of the present invention.

FIG. 6 illustrates a corrugated band member (1) of the fourth embodiment applied to a metal honeycomb core body (H) of the present invention, and corresponds to FIG. 1.

FIG. 7 describes a corrugated band member (1) of the fifth embodiment applied to a metal honeycomb core body (H) of the present invention, and corresponds to FIG. 1.

As shown in FIG. 1 to FIG. 7, the waveform structure of the corrugated band member (1) applied to the metal honeycomb core body (H) of the present invention satisfies the condition that "the waveform structure comprises an area (1a) where at least one pair of an adjacent crest and trough of the waveform (triangular waveform) of the imaginary corrugated sheet (1') is in contact with a planar band member (2), an area (1b) connected to the above-mentioned contact area (1a) which is not in contact with the planar band member (2), and an area (1c) connected to the above-mentioned noncontact area (1b) and having at least one end which is in contact with the planar band member (2)".

The above-mentioned condition is described herein under in relation to FIG. 1 to FIG. 7.

Contact between one pair of an adjacent crest and trough of the triangular waveform and the planar band member (2), out of the above-mentioned condition, is shown in FIG. 1, FIG. 5, and FIG. 7.

Contact between two pairs of adjacent crests and troughs and the planar band member (2), out of the above-mentioned condition, is shown in FIG. 6.

Next, the condition of the area (1b+1c) including the noncontact area (1b) out of the above-mentioned condition is described with reference to FIG. 1 to FIG. 7.

In the corrugated band member (1) applied to the metal honeycomb core body (H) of the present invention, the waveform structure of the one period length (one unit length) (λ) has a complementary area (1c) connected to the area (1b) for completing a waveform structure having one period length (λ) in addition to the above-mentioned areas (1a and 1b) as described herein above.

In short, the waveform structure of one period length (λ) of a corrugated band member (1) of the present invention comprises the above-mentioned areas (1a, 1b, and 1c).

The above-mentioned complementary area (1c) may comprise only the portion which is in contact with the planar band member (2) (refer to FIG. 1, FIG. 3, and FIG. 6), or may comprise both the portion which is in contact with the planar band member (2) and the portion which is not in contact with the planar band member (2) (refer to FIG. 5 and FIG. 7).

In the waveform structure of the above-mentioned area (1c), the area which is not in contact with the planar band member (2) has a height of one-half (½·h) of the height of the imaginary corrugated sheet (1') and has a wave plane approximately parallel to the planar band member (2), and the size of the wave plane (width in the moving direction of the waveform) may be one-half of the wavelength (λ') of the imaginary corrugated sheet (1'), or may be an integer multiple, which is 2 or larger of one-half (½·λ) of the wavelength (λ) of the imaginary corrugated sheet (1').

In the waveform structure of the above-mentioned area (1c), the number of portions which are in contact with the planar band member (2) and the number of portions which are not in contact with the planar band member (2) may be prescribed as desired.

Figure 9:
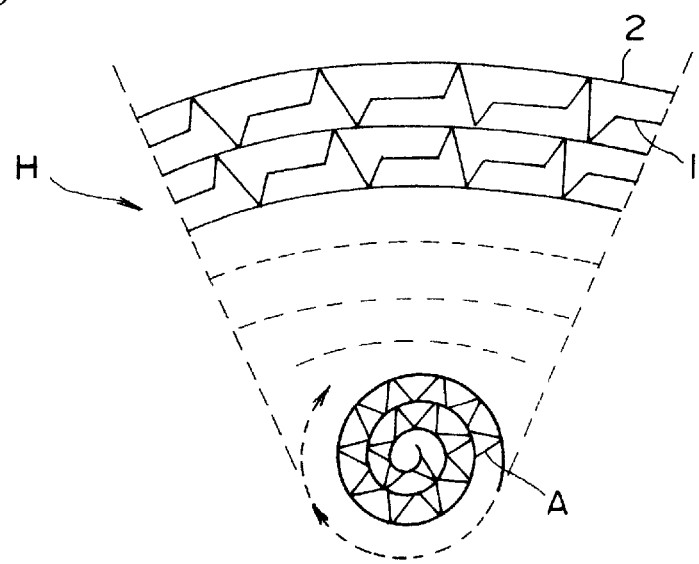
FIG. 9 is a partially omitted front view of a metal honeycomb core body (H) of the present invention comprising the above-mentioned corrugated band member (1) shown in FIG. 8 and a planar band member (2).

FIG. 8 and FIG. 9 are drawings for illustrating a corrugated band member (1) of the sixth embodiment applied to a metal honeycomb core body (H) of the present invention.

FIG. 8 is a drawing corresponding to FIG. 1. FIG. 9 is a partially omitted front view of a rolling type metal honeycomb core body (H) fabricated by use of a corrugated band member (1) of the sixth embodiment shown in FIG. 8 and a planar corrugated band member (2). FIG. 9 also illustrates, in particular, the structure of the center area (rolling center) and peripheral area.

As shown in FIG. 8, the corrugated band member (1) of the sixth embodiment (1) is the same corrugated band member (1) as that of the third embodiment having the waveheight (h) (refer to FIG. 3), and
(2) comprises an area (A) of triangular waveform having the same waveheight (h) and one period length (λ') at one end thereof.

The corrugated band member (1) of the sixth embodiment having the above-mentioned waveform structure is important for fabrication of rolling type metal honeycomb core bodies (H). In detail, the above-mentioned corrugated band member (1) of the sixth embodiment is used when a corrugated band member (1) and a planar band member (2), that is the other structural member, are rolled together so that the above-mentioned area (A) of triangular waveform is positioned at the roll center and the vicinity thereof to fabricate a rolling type metal honeycomb core body (H).

If a corrugated band member (1) having no above-mentioned area (A) of triangular waveform is used when a rolling type metal honeycomb core body (H) is fabricated, because the rate of contact between the corrugated band member (1) and the planar band member (2) (namely the number of contacts per unit volume) is smaller than that in the case when a conventional corrugated band member (1') is used, the waveform portion is apt to be deformed due to the stress exerted during roll forming. In particular, a large stress is exerted on the center of roll forming and the vicinity thereof. The corrugated band member (1) of the sixth embodiment is important in fabrication of rolling type metal honeycomb core bodies (H).

FIG. 9 is a drawing for illustrating the advantage of the corrugated band member (1) of the sixth embodiment, in detail, the triangular waveform area (A) is positioned at the rolling center and the vicinity thereof and the triangular waveform area (A) forms even a triangular cell structure at the rolling center and the vicinity thereof. The advantage of the corrugated band member (1) of the third embodiment (refer to FIG. 3) is effective on the other portion.

In the present invention, the size of the area (A) of the above-mentioned triangular waveform, namely the length (1A) of the area (A) of triangular waveform shown in FIG. 8 may be prescribed as desired. For example, in the case of a metal honeycomb core body (H) having a diameter of 100 mm, the length (1A) may be prescribed so that the area (A) of triangular waveform is located in the range having a radius of 5 mm to 15 mm from the roll center.

In the present invention, various modifications of the area (A) of triangular waveform is possible. For example, the waveform is by no means limited to the triangular waveform, and the waveheight (h) may be same as that of the corrugated band member (1) or may be different.

Figure 10:
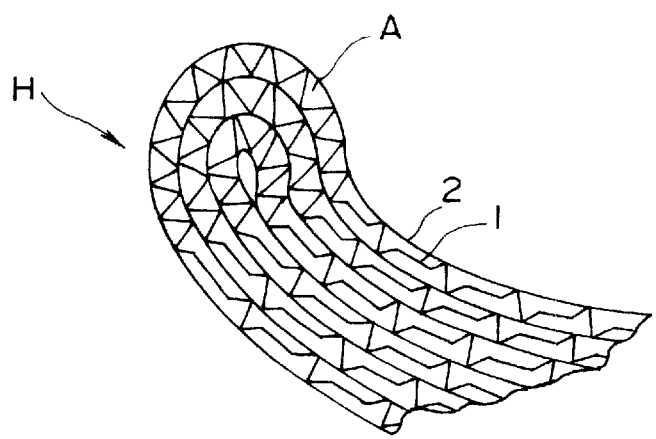
FIG. 10 is a partially enlarged front view of the rolling center of an S-shaped metal honeycomb core body (H) of the present invention comprising a corrugated band member (1) in accordance with the seventh embodiment and a planar band member (2).

FIG. 10 is a drawing for illustrating a corrugated band member (1) of the seventh embodiment applied to a metal honeycomb core body (H) of the present invention.

Figure 20:
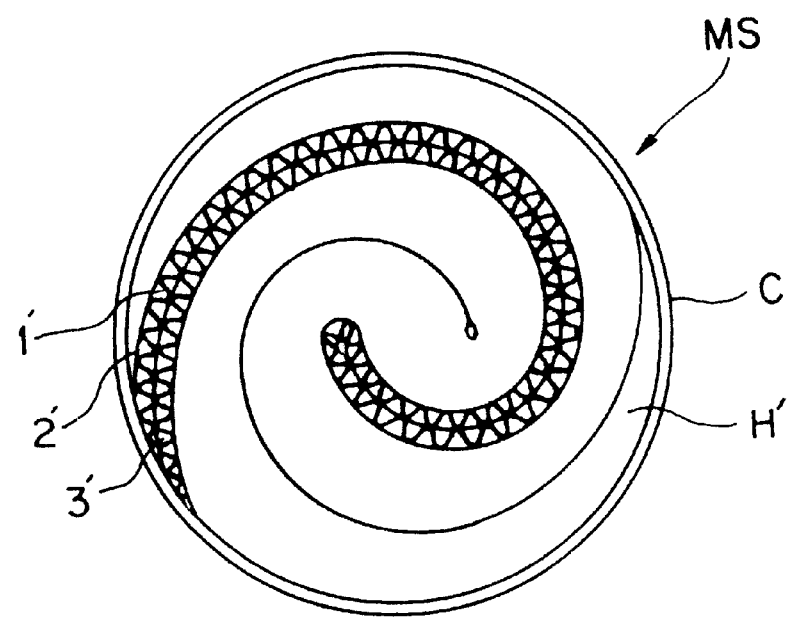
FIG. 20 is a partially omitted front view of a conventional S-shaped metal honeycomb core body (H').
Figure 21:
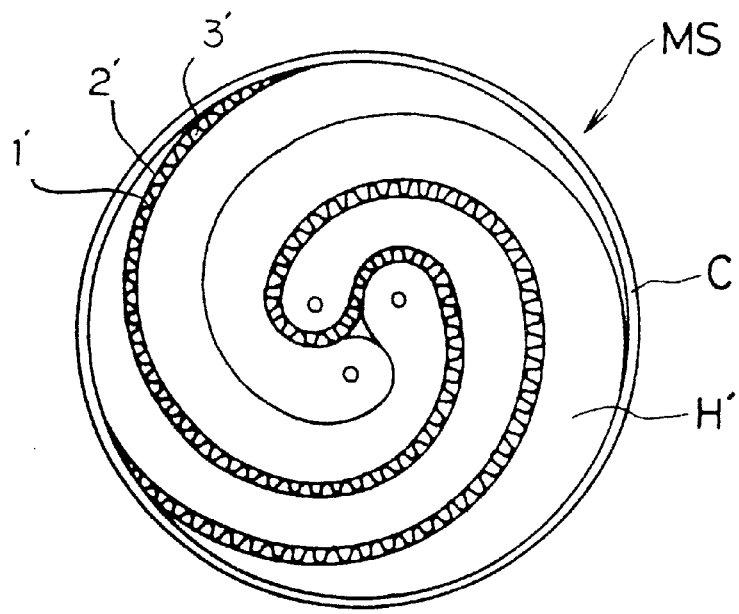
FIG. 21 is a partially omitted front view of a conventional conjugated-comma type metal honeycomb core body (H').
Figure 22:
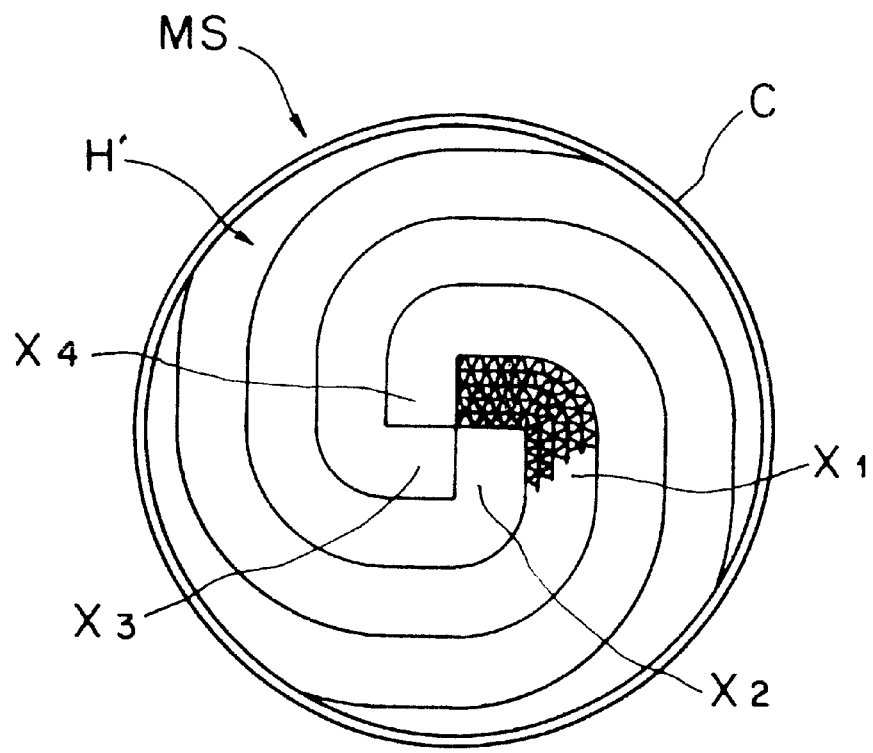
FIG. 22 is a partially omitted from view of a conventional X-lap type metal honeycomb core body (H').

FIG. 10 is the drawing for illustrating the rolling center of the S-shaped metal honeycomb core body (H) (refer to FIG. 20) fabricated by rolling a stack comprising corrugated band members (1) of the seventh embodiment and planar band members (2).

The S-shaped metal honeycomb core body (H) of this type is fabricated through a process in which a desired number of rectangular band members (1 and 2) having a desired length and width are superposed to form a stack, a rod-like rolling tool is placed at the intermediate position on the vertical outermost layer, and the rolling tool is rolled in the same direction.

As the result, a large stress is exerted on the intermediate portion of the corrugated band member (1) during roll forming. For that reason, the area (A) of triangular waveform is positioned on the intermediate portion in the corrugated band member (1) of the seventh embodiment.

As shown in the above-mentioned description, the location of the area (A) of the triangular waveform is different between the corrugated band member (1) of the sixth embodiment (refer to FIG. 8 and FIG. 9) and the corrugated band member (1) of the seventh embodiment (refer to FIG. 10). However, the structure of the corrugated band member (1) of the seventh embodiment shown in FIG. 10 is basically the same as that of the corrugated band member (1) of the sixth embodiment shown in FIG. 8 and FIG. 9.

As shown in FIG. 10, when an S-shaped type metal honeycomb core body (H) is fabricated, the strongest stress is exerted on the vertical outermost layer and layers located near the outermost layer around the center of the stack, therefore, the area (A) of triangular waveform may be provided on corrugated band members (1) located on the stressed portion (vertical outermost layer and layers located near the outermost layer), or may be provided on all the corrugated band members (1) as shown in the drawing.

In the present invention, a corrugated band member (1) (refer to FIG. 8 and FIG. 10) of the sixth and seventh embodiments, namely the corrugated band member (1) having the area (A) of a triangular waveform on at least a partial area, may be manufactured by corrugating a continuous planar band member, or may be manufactured by fixing an area (A) of a triangular waveform, which has been manufactured separately by the use of other member, to a corrugated band member (1) having the special waveform structure of the present invention by means of desired fixing means. As the fixing means, a fixing means such as welding, caulking, mechanical jointing, or temporary fixing may be employed.

In the present invention, a rolling type metal honeycomb core body (H) shown in FIG. 9 may be fabricated by a process in which a corrugated band member (1) of the sixth embodiment (refer to FIG. 8) and a planar band member (2) are superposed so as to be in contact and the superposed layer is rolled. However, the manufacturing process is by no means limited to this process. For example, a rolling type metal honeycomb core body (H) may be fabricated by a process in which first the center portion is fabricated by use of a corrugated band member (1') having a triangular waveform and a planar band member (2), a corrugated band member (1) of the third embodiment having the special waveform structure of the present invention (refer to FIG. 3) and a planar band member (2) are jointed respectively to counterparts, and both band members are rolled continuously.

Next, a method for manufacturing corrugated band members (1) having the above-mentioned various special waveforms applied to fabricate metal honeycomb core bodies (H) of the present invention is described.

The corrugated band member (1) having the above-mentioned special waveform to be applied to the metal honeycomb core body (H) of the present invention is manufactured efficiently and economically by use of a pair of top and bottom corrugating gears.

Figure 11:
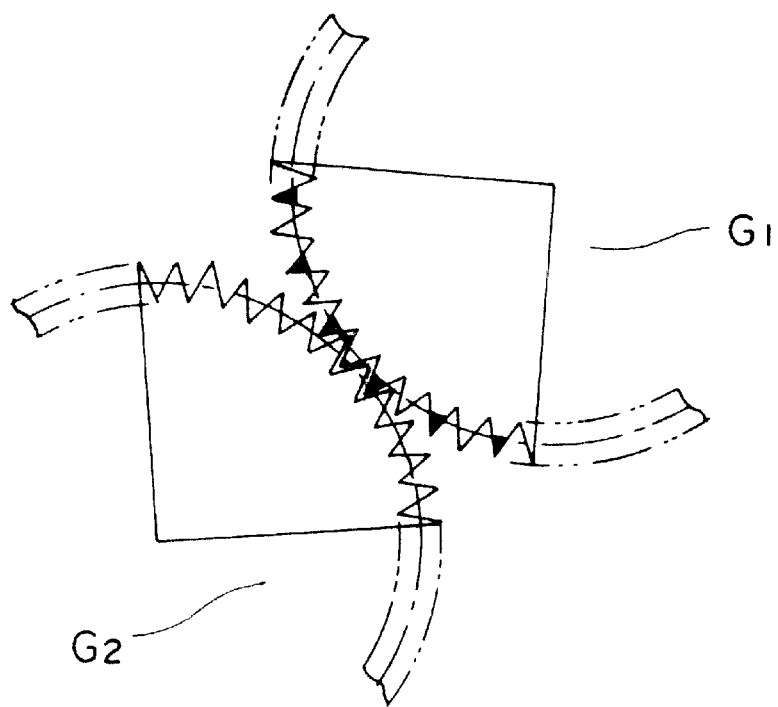
FIG. 11 is a diagram for illustrating a forming gear for making corrugated band members (1) in accordance with the first embodiment shown in FIG. 1.

FIG. 11 is a drawing for illustrating a forming gear for manufacturing corrugated band members (1) of the first embodiment (refer to FIG. 1) applied to metal honeycomb core bodies (H) of the present invention.

Corrugated band members having the waveform structure of the first embodiment of the present invention shown in FIG. 1 are manufactured efficiently and economically by use of a forming gear comprising a pair of top and bottom gears (the first gear (G1) and the second gear (G2)).

In the drawing, a driving gear to drive the first gear and second gear (G1 and G2) is omitted. In FIG. 11 described herein above and in FIG. 12 to FIG. 14, which will be described hereinafter, the blacked portion of the teeth of the first gear (G1) and the second gear (G2) indicates the half height where about one-half of tooth height is removed to form the half height waveform on the noncontact area (1b).

A forming gear comprising a pair of top and bottom gears shown in FIG. 11, as described herein under, is used to manufacture corrugated band members (1) having the waveform structure of the first embodiment of the present invention shown in FIG. 1.

(1) The first gear (G1) has half height teeth and full height teeth alternately and (2) the second gear (G2) has only full height teeth.

The first gear (G1) and the second gear (G2) are located as shown in the drawing.

In the present invention, the half height tooth denotes the tooth from which the half height is removed. The full height tooth denotes the tooth having the full waveform. The above-mentioned half height tooth comprises the residual height which is formed by removing approximately the half height from the top of a tooth, and the top (plane) of a half height tooth is flat.

Figure 12:
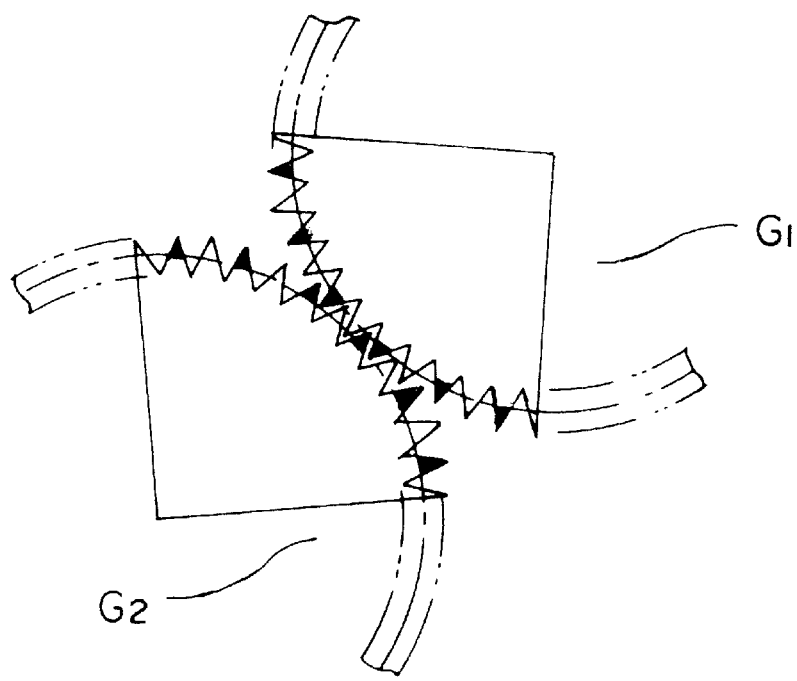
FIG. 12 is a diagram for illustrating a forming gear for making corrugated band members (1) in accordance with the second embodiment shown in FIG. 3.

FIG. 12 is a drawing for illustrating a forming gear for manufacturing corrugated band members (1) (refer to FIG. 3) of the second embodiment applied to metal honeycomb core bodies (H) of the present invention.

To manufacture corrugated band members (1) having the waveform structure of the second embodiment of the present invention shown in FIG. 3, a forming gear comprising a pair of top and bottom gears described herein under is used, as shown in FIG. 12.

(1) The first gear (G1) has alternating half height teeth and full height teeth and (2) the second gear (G2) also has alternating half height teeth and full height teeth.

The first gear (G1) and the second gear (G2) are engaged in the relation as illustrated in the drawing.

Figure 13:
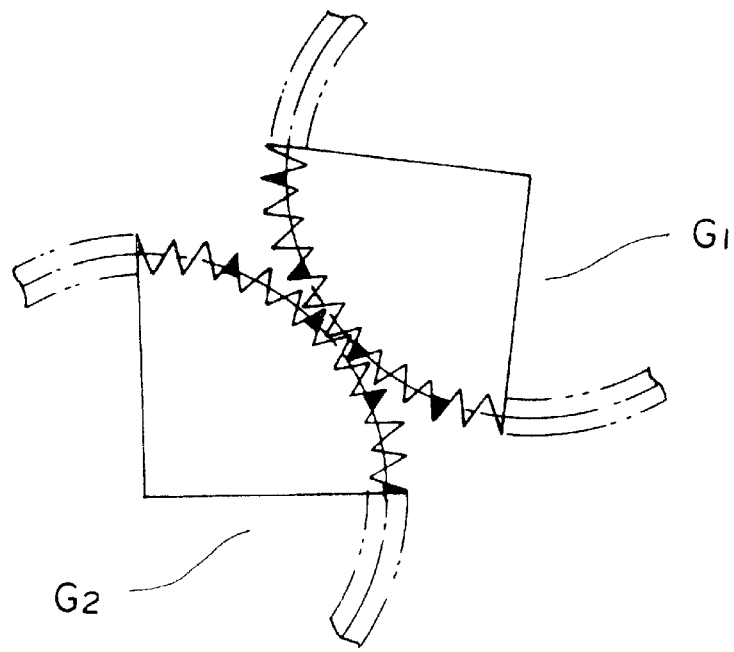
FIG. 13 is a diagram for illustrating a forming gear for making corrugated band members (1) in accordance with the third embodiment shown in FIG. 5.

FIG. 13 is a drawing for illustrating a forming gear for manufacturing corrugated band members (1) of the third embodiment (refer to FIG. 5) applied to metal honeycomb core bodies (H) of the present invention.

To manufacture corrugated band members (1) having the waveform structure of the third embodiment of the present invention shown in FIG. 5, a forming gear comprising a pair of top and bottom gears described herein under is used, as shown in FIG. 13.

(1) The first gear (G1) has a half height teeth with two full height tooth apart and (2) the second gear (G2) also has a half height teeth with two full height tooth apart.

The first gear (G1) and the second gear (G2) are engaged in the relation illustrated in the drawing.

Figure 14:
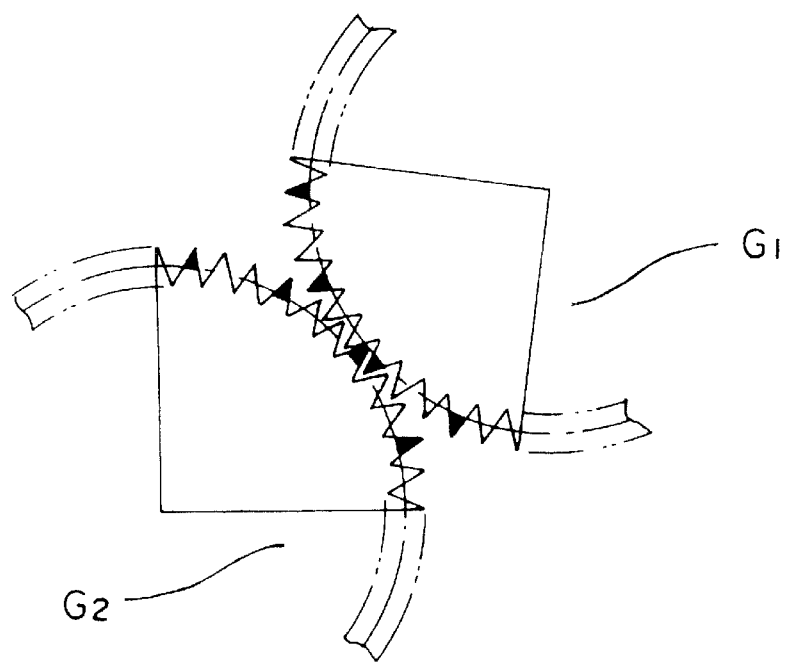
FIG. 14 is a diagram for illustrating a forming gear for making corrugated band members (1) in accordance with the fourth embodiment shown in FIG. 6.

FIG. 14 is a drawing for illustrating a forming gear for manufacturing corrugated band members (1) of the fourth embodiment (refer to FIG. 6) applied to the metal honeycomb core body (H) of the present invention.

To manufacture corrugated band members (1) having the waveform structure of the fourth embodiment of the present invention, shown in FIG. 6, a forming gear comprising a pair of top and bottom gears described herein under is used as shown in FIG. 14.

(1) The first gear (G1) has a half height teeth with two full height tooth apart and (2) the second gear (G2) also has a half height teeth with two full height tooth apart.

The first gear (G1) and the second gear (G2) are engaged in the relation illustrated in the drawing.

It is obvious from the description of the manufacturing process described with reference to FIG. 11 to FIG. 14 that the waveform structure of the corrugated band member (1) having the special waveform structure applied to the metal honeycomb core body (H) of the present invention is quite different from the waveform structure of the imaginary corrugated sheet (1'), in other words, the waveform structure of the corrugated band member (1') having the simple waveform structure, such as a triangular waveform and a sine waveform, has been used as a structural member of the conventional metal honeycomb core body (H'). The imaginary corrugated sheet (1'), namely the corrugated band member (1') having the conventional simple waveform structure, is manufactured by use of, for example, a forming gear comprising a pair of top and bottom gears (G1 and G2) having teeth wherein all the half height teeth shown in FIG. 11 is replaced with full height teeth.

The difference between the corrugated band member (1) of the present invention and the corrugated band member (2) of the prior art is clear because the waveform structure of the corrugated band member (1) of the present invention is specified with reference to the simple waveform structure of the imaginary corrugated sheet (1'), namely the conventional corrugated band member (1').

What is claimed is:

1. A metal honeycomb core body comprising:
a honeycomb structure used for carrying exhaust gas cleaning catalyst, said honeycomb structure including corrugated band members and planar band members made of a thin-walled metal sheet, said honeycomb structure is fabricated by bringing said corrugated and planar band members alternately into contact, wherein said corrugated band members are shaped into a first waveform, said first waveform is a triangular or sinusoidal waveform having a waveheight (h) and one period length (λ), wherein alternating troughs of the first waveform are truncated such that said first waveform has a structure comprising:
a first portion where the first waveform of said corrugated band members is in contact with said planar band members on a pair of an adjacent crest and trough of a wave, a second portion of the corrugated band members that is not in contact with said planar band members and is connected adjacent to the first portion, and a third portion with at least one end that is in contact with said planar band members and is connected adjacent to said second portion, wherein the second portion is formed to have a height of about one half of the waveheight (½·h) of said first waveform, and the first waveform is constituted by connecting the first, second, and third portions to form said first waveform of one period length (λ).

2. The metal honeycomb core body as claimed in claim 1, wherein the second portion has a waveheight of about one half of the waveheight (½·h) of said first waveform and has a wave plane approximately parallel to said planar band members.

3. The metal honeycomb core body as claimed in claim 2, wherein in the second portion, a width of the wave plane in the moving direction of the first waveform is approximately parallel to said planar band members and is about one quarter wavelength (¼·λ) of the first waveform.

4. The metal honeycomb core body as claimed in claim 2, wherein in the second portion, a width of the wave plane in the moving direction of the first waveform is approximately parallel to said planar band members and is an integer multiple which is 2 or larger of about one quarter of the wavelength (¼·λ) of the first waveform.

5. The metal honeycomb core body as claimed in claim 4, wherein said corrugated band members further comprise a second waveform, wherein said second waveform has a waveheight (h) and one period length (λ'), and said second waveform is connected to the first waveform along the moving direction of the first waveform.

6. The metal honeycomb core body as claimed in claim 5, wherein said second waveform forms one end of a the corrugated band member located at a position where a rolling center portion of the metal honeycomb core body will be is formed when said corrugated band members and said planar band members are rolled together to fabricate the rolled metal honeycomb core body.

7. The metal honeycomb core body as claimed in claim 6, wherein said second waveform forms an approximately intermediate portion of said corrugated band members in a longitudinal direction located at a position where a rolling center portion of the metal honeycomb core body is formed when a stack comprising a predetermined number of said corrugated band members and said planar band members having approximately the same width alternately superposed is rolled to fabricate an S-shaped or conjugated comma-shaped metal honeycomb core body.

8. The metal honeycomb core body as claimed in claim 2, wherein the second portion has a size of about one quarter wavelength (¼·λ) of the first waveform per one period length (λ).

9. The metal honeycomb core body as claimed in claim 2, wherein the second portion has a size of an integer multiple which is 2 or larger of about one quarter wavelength (¼·λ) of the first waveform per one period length (λ).

10. The metal honeycomb core body as claimed in claim 1, wherein the third portion has both ends which are in contact with said planar band members, and the second portion has a waveheight of about one half of the waveheight (½·h) of the first waveform and has a wave plane approximately parallel to said planar band members.

11. The metal honeycomb core body as claimed in claim 1, wherein said corrugated band members further comprise a second waveform, wherein said second waveform has a waveheight (h) and one period length (λ'), and said second waveform is connected to the first waveform along the moving direction of the first waveform.

12. The metal honeycomb core body as claimed in claim 11, wherein said second waveform forms one end of the corrugated band member located at a position where a rolling center portion of the metal honeycomb core body is formed when said corrugated band members and said planar band members are rolled together to fabricate the rolled metal honeycomb core body.

13. The metal honeycomb core body as claimed in claim 11, wherein said second waveform forms an approximately intermediate portion of said corrugated band members in a longitudinal direction located at a position where a rolling center portion of the metal honeycomb core body is formed when a stack comprising a predetermined number of said corrugated band members and said planar band members having approximately the same width alternately superposed is rolled to fabricate an S-shaped or conjugated comma-shaped metal honeycomb core body.

14. A metal honeycomb core body comprising:
a honeycomb structure used for carrying exhaust gas cleaning catalyst, said honeycomb structure including corrugated band members and planar band members made of a thin-walled metal sheet, said honeycomb structure is fabricated by bringing said corrugated and planar band members alternately into contact, wherein said corrugated band members are shaped into a first waveform, said first waveform is a triangular or sinusoidal waveform having a waveheight (h) and one period length ($\lambda$) and a structure comprising:
a first portion where the first waveform of said corrugated band members is in contact with said planar band members on a pair of an adjacent crest and trough of a wave;
a second portion of the corrugated band members, wherein a trough is truncated, such that it is not in contact with said planar band members and is connected adjacent to the first portion;
a third portion of the corrugated band members where the first waveform of said corrugated band members is in contact with said planar band members on a pair of an adjacent crest and trough of a wave and is connected adjacent to said second portion;
and a fourth portion of the corrugated band members, wherein a crest is truncated, such that it is not in contact with said planar band members and is connected adjacent to the third portion, wherein
the second and fourth portions are formed to have a height of about one half of the waveheight (½·h) of said first waveform, and the first waveform is constituted by connecting the first, second, third, and fourth portions to form said first waveform of one period length ($\lambda$).

15. The metal honeycomb core body as claimed in claim 14, wherein said corrugated band members further comprise a second waveform, wherein said second waveform has a waveheight (h) and one period length ($\lambda$'), and said second waveform is connected to the first waveform along the moving direction of the first waveform.

16. A metal honeycomb core body comprising:
a honeycomb structure used for carrying exhaust gas cleaning catalyst, said honeycomb structure including corrugated band members and planar band members made of a thin-walled metal sheet, said honeycomb structure is fabricated by bringing said corrugated and planar band members alternately into contact, wherein said corrugated band members are shaped into a first waveform, said first waveform is a triangular or sinusoidal waveform having a waveheight (h) and one period length ($\lambda$) and a structure comprising:
a first portion where the first waveform of said corrugated band members is in contact with said planar band members on at least two pairs of an adjacent crest and trough of a wave;
a second portion of the corrugated band members, wherein a crest and an adjacent trough are truncated, such that it is not in contact with said planar band members and is connected adjacent to the first portion;
and a third portion of the corrugated band members with at least one end that is in contact with said planar band members and is connected adjacent to said second portion, wherein
the second portion is formed to have a height of about one half of the waveheight (½·h) of said first waveform, and the first waveform is constituted by connecting the first, second, and third portions to form said first waveform of one period length ($\lambda$).

17. The metal honeycomb core body as claimed in claim 16, wherein said corrugated band members further comprise a second waveform, wherein said second waveform has a waveheight (h) and one period length ($\lambda$'), and said second waveform is connected to the first waveform along the moving direction of the first waveform.

18. A metal honeycomb core body comprising:
a honeycomb structure used for carrying exhaust gas cleaning catalyst, said honeycomb structure including corrugated band members and planar band members made of a thin-walled metal sheet, said honeycomb structure is fabricated by bringing said corrugated and planar band members alternately into contact, wherein said corrugated band members are shaped into a first waveform, said first waveform is a triangular or sinusoidal waveform having a waveheight (h) and one period length ($\lambda$) and a structure comprising:
a first portion where the first waveform of said corrugated band members is in contact with said planar band members on a pair of an adjacent crest and trough of a wave;
a second portion of the corrugated band members, wherein a trough is truncated, such that it is not in contact with said planar band members and is connected adjacent to the first portion, wherein the second portion is formed to have a height of about one-half of the waveheight (½·h) of said first waveform;
a third portion of the corrugated band members where the first waveform of said corrugated band members is in contact with said planar band members on a pair of an adjacent crest and trough of a wave and is connected adjacent to said second portion;
a fourth portion connected adjacent to the third portion and with at least one end that is connected to said planar band members, wherein said fourth portion is formed to have a height of about one half of the waveheight (½·h) of said first waveform;
a fifth portion connected adjacent to said fourth portion and with one end connected to said planar band members; and
a sixth portion connected adjacent to said fifth portion with at least one end that is connected to said planar band members, wherein said sixth portion is formed to have a height of about one half of the waveheight (½·h) of said first waveform, and wherein the first waveform is constituted by connecting the first, second, third, fourth, fifth, and sixth portions to form said first waveform of one period length ($\lambda$).

19. The metal honeycomb core body as claimed in claim 18, wherein said corrugated band members further comprise a second waveform, wherein said second waveform has a waveheight (h) and one period length ($\lambda$'), and said second waveform is connected to the first waveform along the moving direction of the first waveform.

* * * * *